United States Patent
McCurry (10) Patent No.: US 6,637,756 B2
(45) Date of Patent: Oct. 28, 2003

(54) POWER DRILL CHUCK

(76) Inventor: Troy L. McCurry, 551 Burnt Tanyard Rd., West Union, SC (US) 29696

( * ) Notice: Subject to any disclaimer, the term of this patent is extended or adjusted under 35 U.S.C. 154(b) by 0 days.

(21) Appl. No.: 10/107,950

(22) Filed: Mar. 27, 2002

(65) Prior Publication Data

US 2003/0184029 A1 Oct. 2, 2003

(51) Int. Cl.$^7$ .............................................. B23B 31/12
(52) U.S. Cl. ....................................... 279/61; 279/902
(58) Field of Search .............. 279/60–62, 64, 279/140, 902; 384/539

(56) References Cited

U.S. PATENT DOCUMENTS

| | | | |
|---|---|---|---|
| 66,081 A | * 6/1867 | Harris et al. ................. | 279/61 |
| 234,109 A | 11/1880 | Burkholder | |
| 684,564 A | 10/1901 | Butler | |
| 1,148,202 A | 7/1915 | Swinburne | |
| 1,195,214 A | * 8/1916 | Hapgood .................... | 279/61 |
| 1,227,533 A | 5/1917 | Ebert | |
| 1,510,896 A | 10/1924 | McConnell | |
| 2,607,602 A | * 8/1952 | Sasse ......................... | 279/60 |
| 2,607,642 A | * 8/1952 | Gilbert ...................... | 384/539 |
| 4,266,789 A | * 5/1981 | Wahl et al. ................. | 279/60 |
| 4,366,732 A | 1/1983 | Schliep ...................... | 81/128 |
| 4,575,108 A | 3/1986 | Whitehead .................. | 279/59 |
| 5,125,673 A | 6/1992 | Huff ........................... | 279/60 |
| 5,348,318 A | 9/1994 | Steadings .................... | 279/62 |
| 5,540,124 A | 7/1996 | Srhoj .......................... | 81/128 |
| 6,010,135 A | 1/2000 | Miles ......................... | 279/62 |

FOREIGN PATENT DOCUMENTS

| | | | |
|---|---|---|---|
| DE | 3411127 A1 | * 10/1985 | 279/62 |
| FR | 986604 A | * 8/1951 | 279/61 |

* cited by examiner

*Primary Examiner*—Steven C. Bishop
(74) *Attorney, Agent, or Firm*—McNair Law Firm, P.A.; Cort Flint (57) ABSTRACT

A chuck for a power tool having a plurality of chuck jaws of the type that open to receive a work tool and close to grip the work tool, wherein the chuck comprises a front sleeve, a rear sleeve, and an integral chuck jaw unit fitted within the front and rear sleeves in a removable manner. The chuck jaw unit includes a plurality of chuck jaws, a support body having individual jaw bores for receiving the chuck jaws, a traveler affixed to the remote ends of the chuck jaws; and an operator for reciprocating the traveler along a chuck axis to open and close the chuck jaws. The traveler includes internal traveler threads and the operator includes a threaded barrel in the form of a jack screw on which the traveler threads up and down. The operator of the chuck unit and the rear sleeve may be press fitted together so that manual rotation of the rear sleeve causes the operator to rotate whereby the traveler reciprocates.

56 Claims, 8 Drawing Sheets

POWER DRILL CHUCK

BACKGROUND OF THE INVENTION

The invention relates to power tools, and particularly to a chuck for a power tool driver having a simplified construction for holding a work tool with increased gripping power and reliability.

Power tool drivers, portable and stationary are well known, such as power hand tools, stationary press and milling machines, and other metal and wood working machines. Although twist drills are the most common tools used with such drivers, screw drivers, nut drivers, burrs, mounted grinding stones, and other cutting or abrading work tools may also be used. Since the work tool may have shanks having various diameters or polygonal cross sections, the power driver is provided with a chuck that is adjustable over a relatively wide range. The chuck may be attached to the power driver by a threaded or tapered bore. A wide variety of chucks have been developed in the art. In one common form three, threaded jaws spaced circumferentially 120° apart are constrained in angularly disposed passageways in a body. The body is attached onto the drive shaft of a power tool. The chuck typically includes a front sleeve that is pressed to a nut having interior threads. The interior threads mesh with threaded portions of the chuck jaws so that as the front sleeve is rotated, the jaws are caused to either open or close depending on the direction of rotation. The front sleeve is fitted on a rear sleeve so that a bearing or bearing ring must be provided between the nut and the rear sleeve assembly. Because the front sleeve turns, the bearing must necessarily be located near the front of the chuck where direct and other particles, which may damage the bearing, can easily reach the bearing. The gripping force applied by the jaws to the work tool is limited by the small contact area between the mating nut threads and jaw threads so that the gripping torque at the chuck bite is also limited. Because the jaws are threaded, the amount the jaws can be hardened is limited or the threads are made brittle and highly susceptible to breakage. The hardness of the work tool is usually greater than the hardness of the chuck jaws so that the accuracy of the run out of the work tool is also limited. Moreover, since the typical chuck is front sleeve actuated, the work tool is susceptible to loosening in the chuck if the front sleeve bumps anything in operation. This often occurs when working or drilling in corners or other tight places. Perhaps the most difficult problem with prior art chucks occurs in their manufacture and assembly. During manufacture, the jaw passages which are drilled out as bores in the body, typically cannot be bored straight through a solid body, but must be formed as more than one bore with interruptions between the multiple bores. By necessity, the jaws must reciprocate in the bores. If misalignment of the multiple bores occurs, the jaws may not function properly and break. However, the biggest problem occurs during assembly. Because the chuck cannot be tested until the front and rear sleeves are pressed to other parts, they cannot be disassembled without destruction of the chuck beyond reuse. Typically, a completed chuck is tested for run out and is tested for a high/low condition of the nose ends of the jaw, i.e., the nose ends are not flush. Also, if a jaw is placed in the wrong bore the chuck will not operate properly. The entire chuck is typically thrown away if the chuck is defective resulting in enormous material waste. Neither can the chuck be disassembled for repair. Examples of typical chucks are disclosed in U.S. Pat. Nos. 5,125,673, 5,348,318, and 6,015,135. The latter two patents being directed to some of the bearing problems associated with the typical front sleeve actuated chucks.

Accordingly, an object of the present invention is to provide an improved chuck for reliably gripping a work tool while driven by a power tool and machine;

Another object of the present invention is to provide a chuck for gripping a power tool having increased gripping torque and ease of operation.

Another object of the present invention is to provide a chuck having a self-centering operator for opening and closing chuck jaws for more reliable gripping of a power tool for reliable straight run out.

Another object of the present invention is to provide a chuck for gripping a power tool wherein the jaws may be actuated by rear rotation for increased gripping and reliability.

Another object of the present invention is to provide a chuck for gripping a power tool which can be easily assembled and disassembled during manufacture for reducing waste and facilitating repairs after manufacture.

Still another object of the present invention is to provide a chuck for gripping a power tool to provide a chuck which can be tested as a chuck before assembly of the front and rear sleeves.

Still another object of the present invention is to provide a chuck for gripping a power tool having a self-centering jack screw operator for actuating the chuck jaws and providing increased tool gripping torque.

Yet another object of the present invention is to provide a chuck for gripping a power tool which is actuated by rotation of the rear sleeve for increased tool torque and to prevent accidental unloading.

SUMMARY OF THE INVENTION

The above objectives are accomplished according to the present invention by a power tool chuck for gripping a work tool comprising a sleeve having a front sleeve and a rear sleeve and a longitudinal chuck axis. A plurality of non-threaded chuck jaws are provided for gripping the work tool. A support body is carried within the sleeve having a plurality of jaw bores for slidably receiving the chuck jaws. A reciprocating traveler is carried in the sleeve, and a rotating operator is carried within the sleeve for reciprocating the traveler along the chuck axis. The chuck jaws have nose ends with bites for gripping the work tool, and the chuck jaws having opposite remote ends carried by the traveler. The operator is affixed with the rear sleeve for rotation with the rear sleeve. In this manner, the chuck bearing is moved to the rear of the chuck. Rotation of the rear sleeve in a first direction moves the traveler causing the nose ends of the chuck jaws to open, and rotation of the rear sleeve in a second direction moves the traveler causing the nose ends to grip the tool. The operator includes an operator base press fitted with the rear sleeve, and a central upstanding operator barrel. Manual rotation of the rear sleeve causes the operator barrel to rotate whereby the traveler reciprocates. Advantageously, the operator barrel is designed as a self-centering jack screw having external operator threads. The traveler includes internal traveler threads which mate with the operator threads on the operator barrel. In one important aspect of the invention, a release space is defined between the support body and an end of the operator barrel. The operator has a jaw release position in which the operator barrel moves into the release space beyond the traveler and engages the support body when the rear sleeve is rotated to open the chuck jaws. A reaction force is created between the operator barrel and support body in the release position causing the traveler to move backwards to produce an initial release of the chuck jaws whereby further rotation of the rear sleeve causes the traveler to continue its backwards travel and open the chuck jaws more fully. A sleeve gap is formed between the front and rear sleeves allowing relative axial movement between the front and rear sleeves. A biasing element is disposed between the front and rear sleeves for biasing the sleeves apart. The sleeve gap decreases as the operator barrel moves into the release space to engage the support body.

Advantageously, the support body includes a support head affixed in the front sleeve and a support shaft extending from the support head and into the rear sleeve. The operator barrel includes a hollow interior in which the support shaft is received so that the operator barrel rotates about the support shaft. The rear sleeve includes a rear opening through, which an end of the support shaft extends to form a protruding shaft end. A locking member engages the protruding shaft end for locking the front sleeve, support shaft, and rear sleeve together. The locking member is removable for disassembly and reassembly. The jaw bores formed in the support head have a bore axis with a prescribed inclination to the chuck axis; and the traveler includes upper inclined bearing surfaces for engaging a first complimentary portion of the jaw end fitting for pushing the jaws through the inclined bores of the support body, and upper bearing surfaces being inclined generally orthogonal to the bore axis for transferring and applying a full upward force from the operator to the jaws in the direction of the bore axis. Lower inclined bearing surfaces are formed on the traveler for bearing against a second complimentary portion of the remote jaw end when the traveler is moved to open the jaws, and the upper and lower inclined bearing surfaces are parallel to each other.

A particular important advantage of the invention is that an integral chuck jaw unit assembly may be provided in a stand-alone form before being pressed into a front and rear sleeve. The integral chuck unit assembly comprises the chuck jaws constrained in the jaw bores of the support body, remote ends of the chuck jaws fitted to the reciprocating traveler, a central operator for reciprocating the traveler, a shaft of the support body extending through the operator, and a locking member engaging the shaft to hold the assembly together without a front and rear sleeve. The integral chuck unit may be assembled and tested as a power tool chuck without a front and rear sleeve, and may be disassembled for repair.

A method for assembling and disassembling a chuck of a power tool which grips a work tool comprises providing a front sleeve and a rear sleeve, and providing an integral chuck jaw unit which includes a support body having a plurality of chuck jaws slidably carried within the support body, and a traveler affixed to the ends of the support jaws, and an operator for reciprocating the traveler. The method includes pressing the support body in the front sleeve; pressing the operator in the rear sleeve, and affixing a removable locking member between the chuck jaw unit and the rear sleeve to complete the assembly wherein the locking member can be removed for disassembling the chuck.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
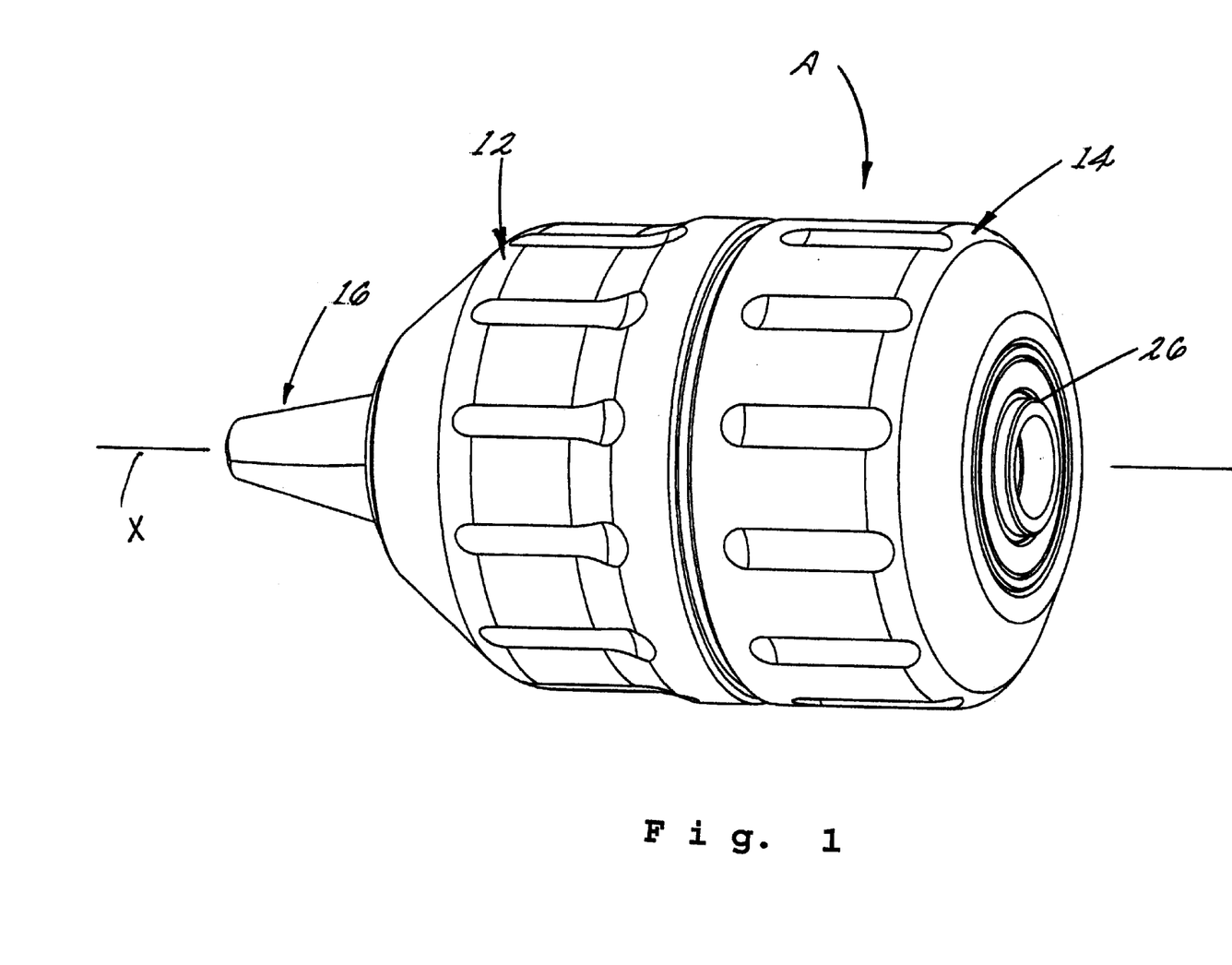
FIG. 1 is a side elevation of a power tool having a keyless chuck constructed according to the present invention.
Figure 2:
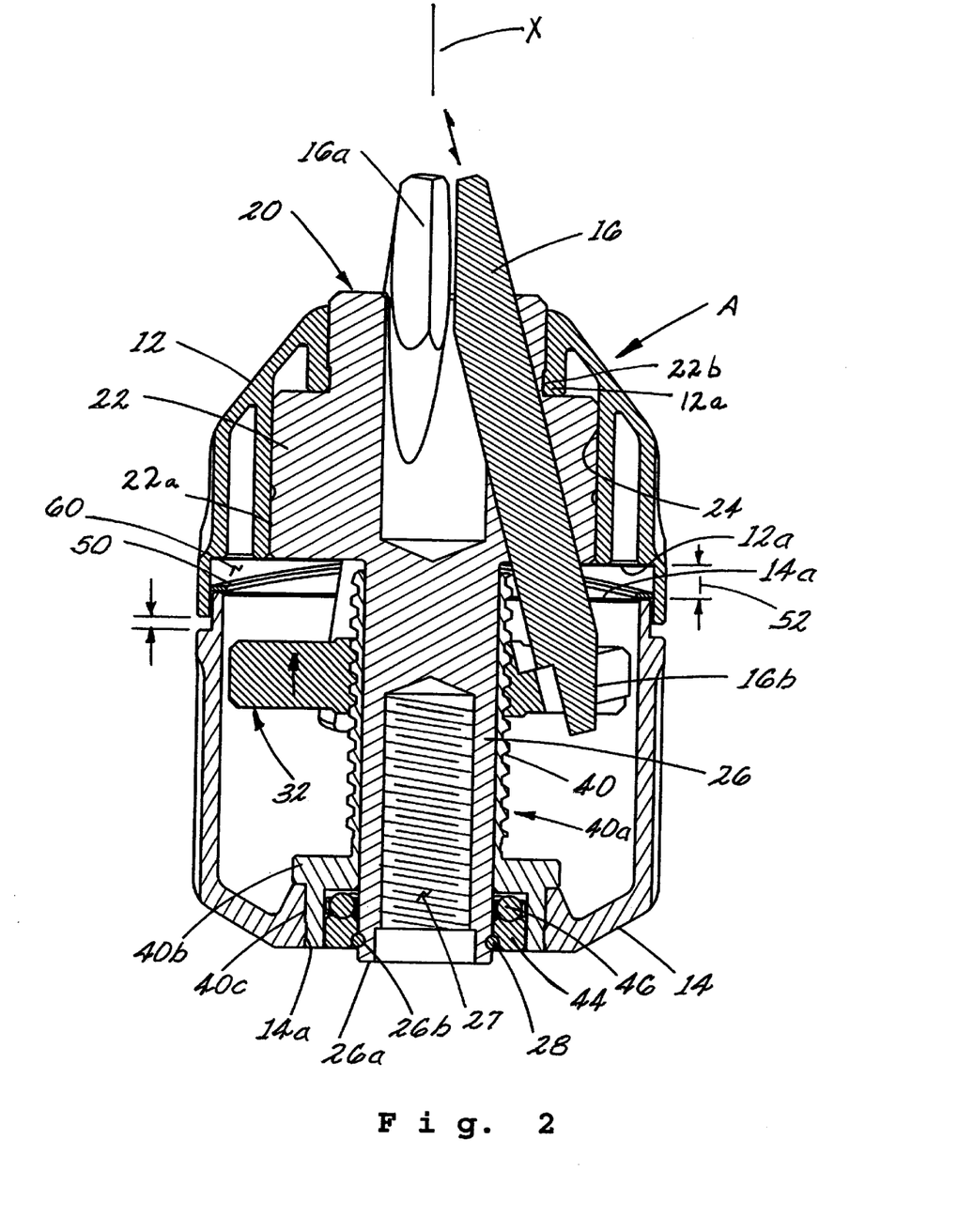
FIG. 2 is a sectional view taken along line 2—2 of FIG. 1 showing a keyless chuck according to the present invention.

Referring now to the drawings, the invention will now be described in more detail. As can best be seen in FIG. 1, a power tool chuck, designated generally as A, is illustrated having a front sleeve 12 and a rear sleeve 14 with a chuck axis "X." A plurality of non-threaded chuck jaws 16 have nose ends 16 extending from front sleeve 12. Referring to FIG. 2, it can be seen that a support body 20 is carried within and press fitted in front sleeve 12, and protrudes past the end of rear sleeve 14. Support body 20 includes a support head 22 fitted within a cavity 24 of front sleeve 12. Support body 20 includes a support shaft 26 extending from head 22. Support head 22 includes circumferential knurls 22a to keep the front sleeve from rotating around support body 20 when pressed thereon. Support head 22 also includes a front undercut 22b in which a molded-in protrusion 12a of front sleeve 12 snaps when assembled to create a positive locking together of the two parts. Support shaft 26 is axially affixed in rear sleeve 14 by means of a lock element such as lock ring 28. For this purpose, support shaft 26 includes a free end 26a having a retaining groove 26b in which lock ring 28 fits. In this manner, the front and rear sleeves together with an integral, internal chuck unit assembly B, which fits inside the front and rear sleeves, are secured together. The simple placement or removal of lock ring 28 allows for assembly or disassembly of the entire chuck. (There is an interior threaded bore 27 formed inside support shaft 26 which is threaded onto the power tool drive shaft (not shown)). A self-operating, integral assembly is provided for chuck unit B as a stand alone assembly which can be tested as a chuck and for run out without front and rear sleeves. If for any reason the unit is found defective, it can be disassembled and repaired.

Figure 3:
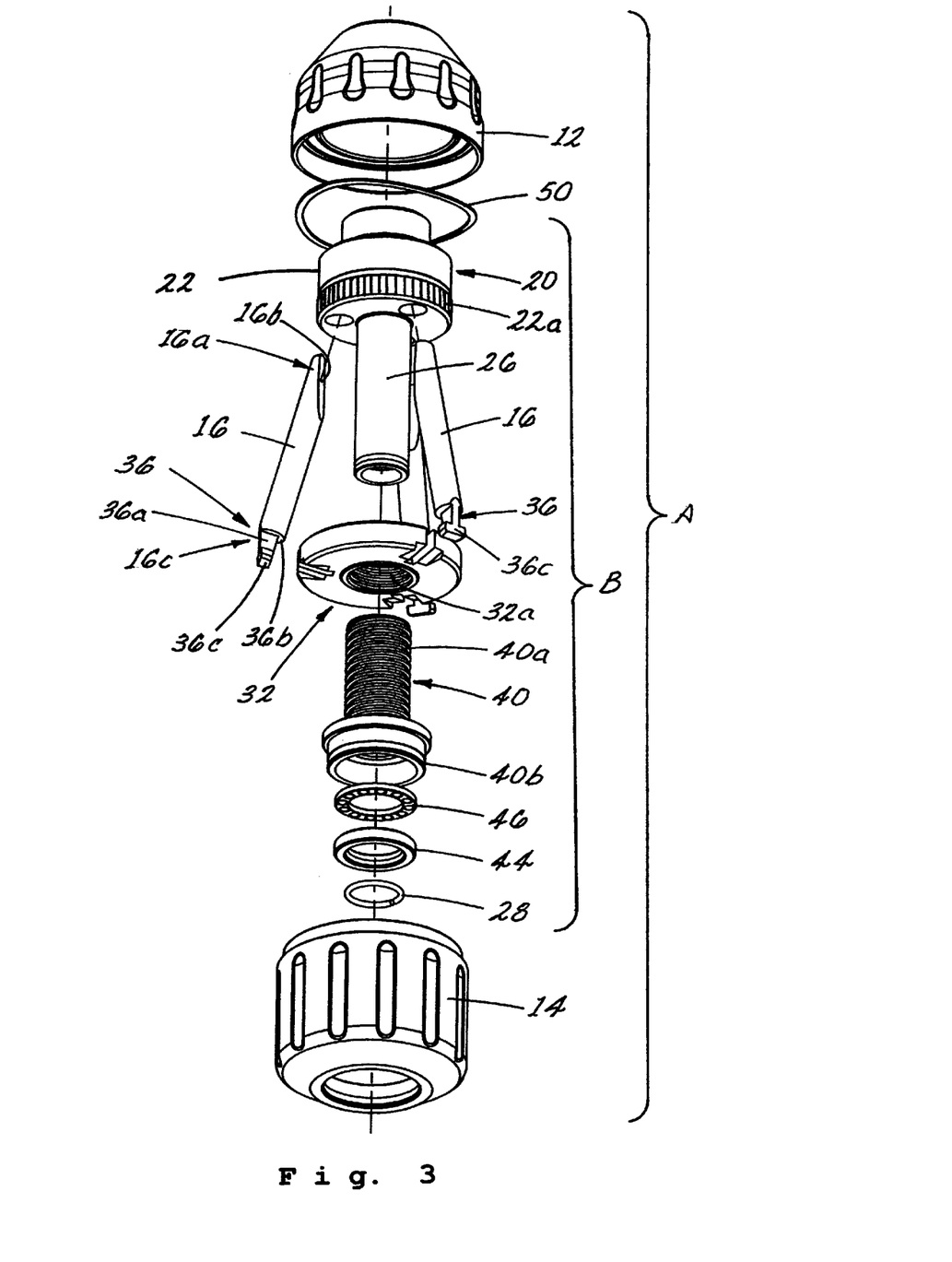
FIG. 3 is a side perspective showing parts of the keyless chuck of the present invention with parts separated.
Figure 4:
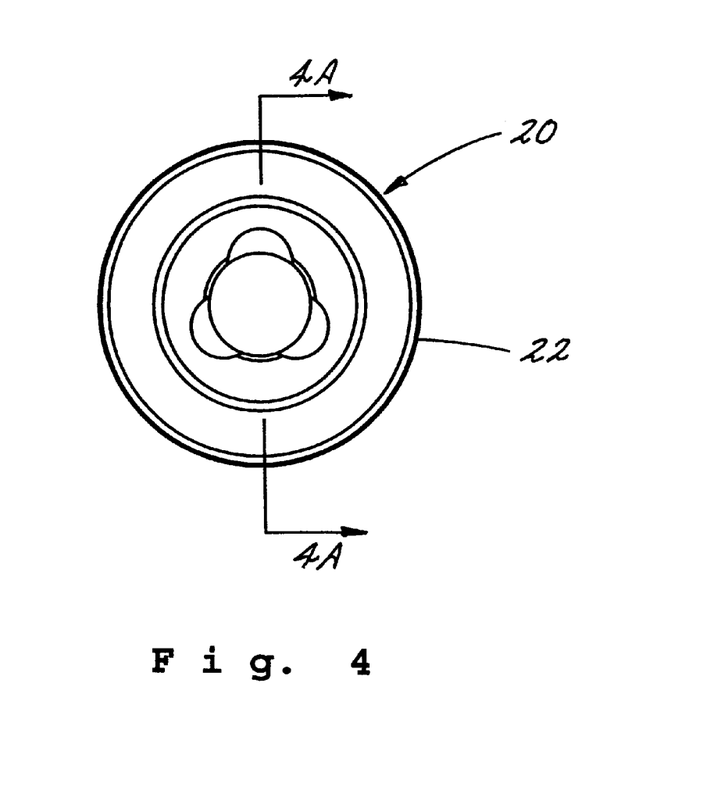
FIG. 4 is a front elevation of a support body for a keyless chuck according to the present invention.
Figure 4A:
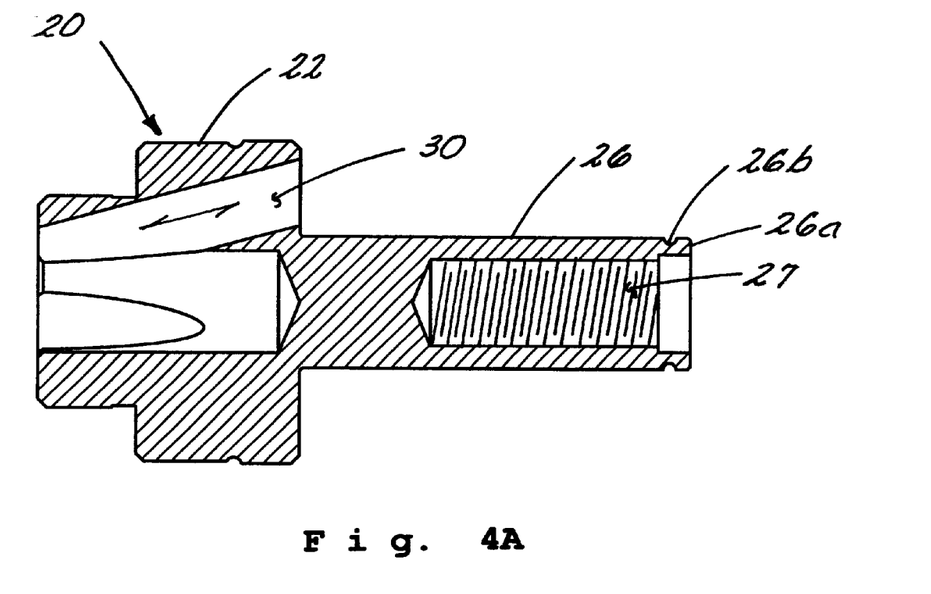
FIG. 4A is a sectional view taken along line 4A—4A of FIG. 4.
Figure 6:
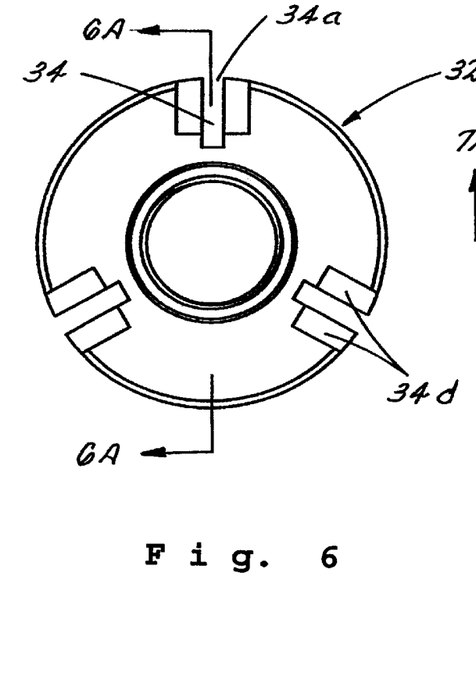
FIG. 6 is a bottom view of a traveler for a keyless chuck according to the invention.
Figure 6A:
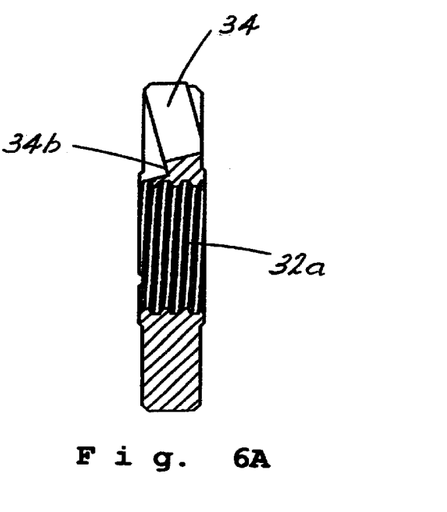
FIG. 6A is a sectional view taken along line 6A—6A of FIG. 6.
Figure 7:
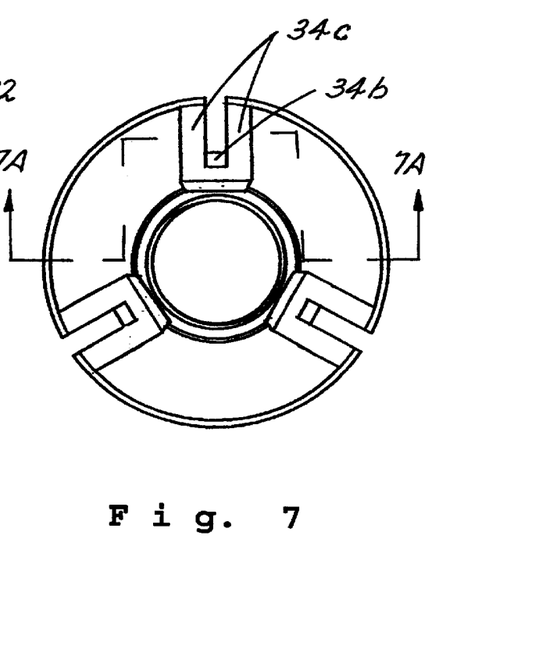
FIG. 7 is a top plan view of a traveler nut according to the invention.
Figure 7A:
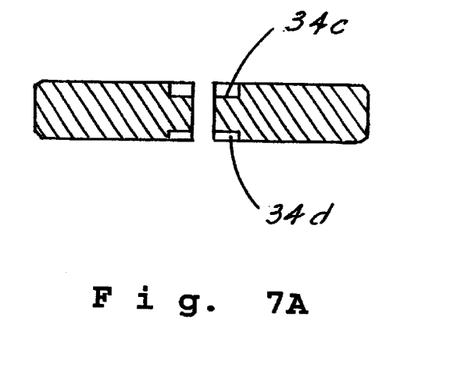
FIG. 7A is a sectional view taken along line 7A—7A of FIG. 7.
Figure 8:
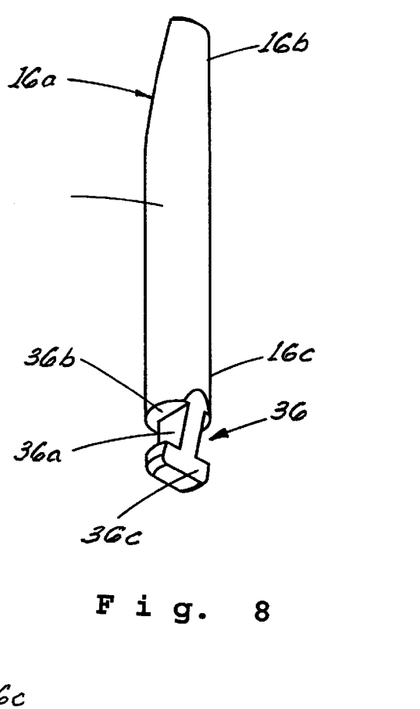
FIG. 8 is a perspective view of a chuck jaw according to the invention.
Figure 9:
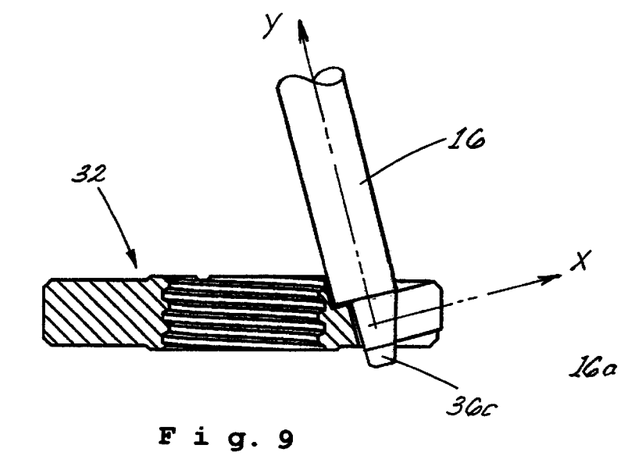
FIG. 9 is a partially section view of a traveler nut with a jaw having an end fitting with the jaw in a closed position.
Figure 10:
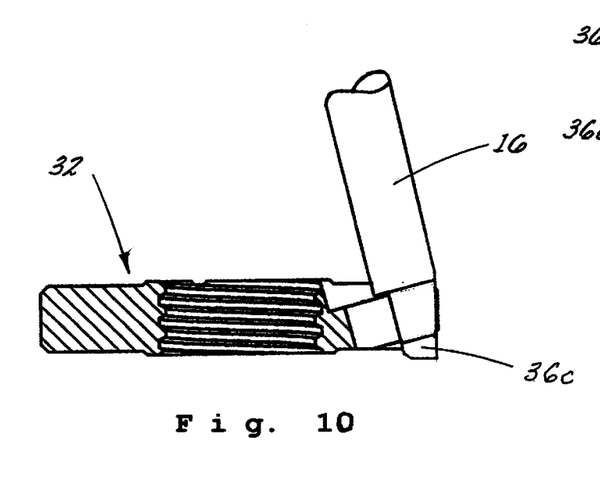
FIG. 10 is a partial section view of a traveler nut with a jaw having an end fitting with the jaw in an open position.

In the illustrated embodiment there are three chuck jaws 16 extending through inclined bores 30 formed in support head 22 of support body 20 (FIG. 3). The chuck jaws are equiangularly located in support body head 22. Most notably, the jaws are smooth and are not threaded as in the prior art. Each jaw includes a nose end 16a having a bite 16b, and a remote end 16c. Remote fitted ends 16c are affixed within a non-rotating traveler nut 32 which has a threaded interior bore 32a. There are three radial slots 34 formed in the traveler which extend radially inward toward threaded passage 32a (FIGS. 67A). Remote ends 16c of chuck jaws 16 include end fittings 36 which include a narrow shank 36a, a shoulder 36b, and widened flange 36c (FIGS. 8–10). Radial traveler slots 34 have open ends 34a for receiving narrow shank 36a of remote ends 16c. Narrow shanks 36a are formed by a machined cut-out of jaw 16 which defines surrounding shoulder 36b which surrounds shank 36a. An operator 40 is carried in sleeve 10 for reciprocating traveler 32. Operator 40 includes a threaded barrel 40a and an operator base 40b pressed into rear sleeve 14. The chuck is rear sleeve actuated because operator 40 rotates with the rear sleeve. Internal traveler nut threads 32a are, threaded onto threaded operator barrel 40a. The barrel is provided with straight threads which are much stronger than conventional chuck operator threads. As rear sleeve 14 is rotated, the operator barrel rotates to thread traveler 32 up and down depending on the direction of rotation. In this manner, operator 40 functions as a self-centering jack screw for reciprocating chuck jaws 16, constrained by support body bores 30, in a self-centering manner to provide a true run out of the work tool. Jaw shoulder 36a provides an increased surface area for traveler 32 to push against when the traveler is threaded up on operator 40 so that increased gripping torque is applied against the work tool at jaws bite 16b. As can best be seen in FIGS. 6A and 7, slots 34 are machined so that the slots slant upwards and outwards with a support ledge 34b at a rear of radial slots 34. There are a pair of upper bearing surfaces 34c machined on each side of slot 34 on the upper side of traveler 32, and a pair of lower bearing surfaces 34d machined on the each side of radial slots 32 on a lower side of traveler 32. In use, narrow shank 36a of remote jaw end 16c is received in narrow slot 34 with shank shoulder 36a supported on upper bearing surfaces 34c. Widened flange 36c engages lower bearing surfaces 34d of slot 34. It can thus be seen that increased surface area is provided by bearing surfaces 34b, 34c, 34d of slot 34, and corresponding surfaces of shoulder 36b and widened flange 36a, so that more grip torque is produced by the chuck jaws at the jaw bites, as compared to the limited area provided by limited thread contact surface area in the prior art. As can best be seen in FIGS. 2 and 9–10, the traveler bearing surfaces and jaw bearing surfaces are orthogonal to one another so that the traveler bearing surfaces, and the jaw shoulder and flange surfaces produce a force directly applied to the jaws along the jaw axis and bore axis "Y."

Figure 2A:
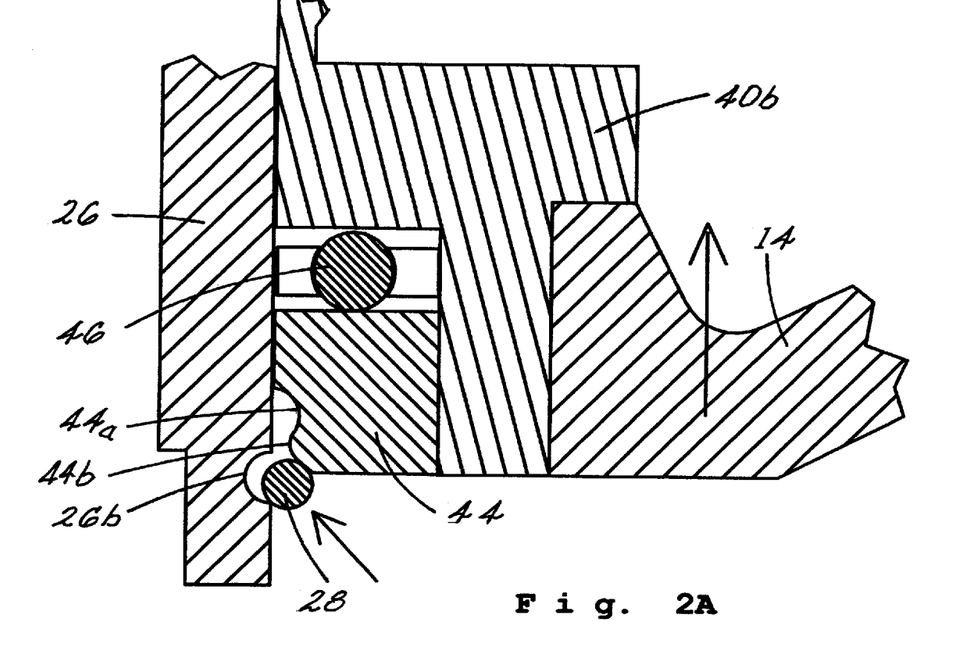
FIG. 2A is a partial sectional view of an assembly stage wherein a locking ring is inserted into a support shaft grove.
Figure 2B:
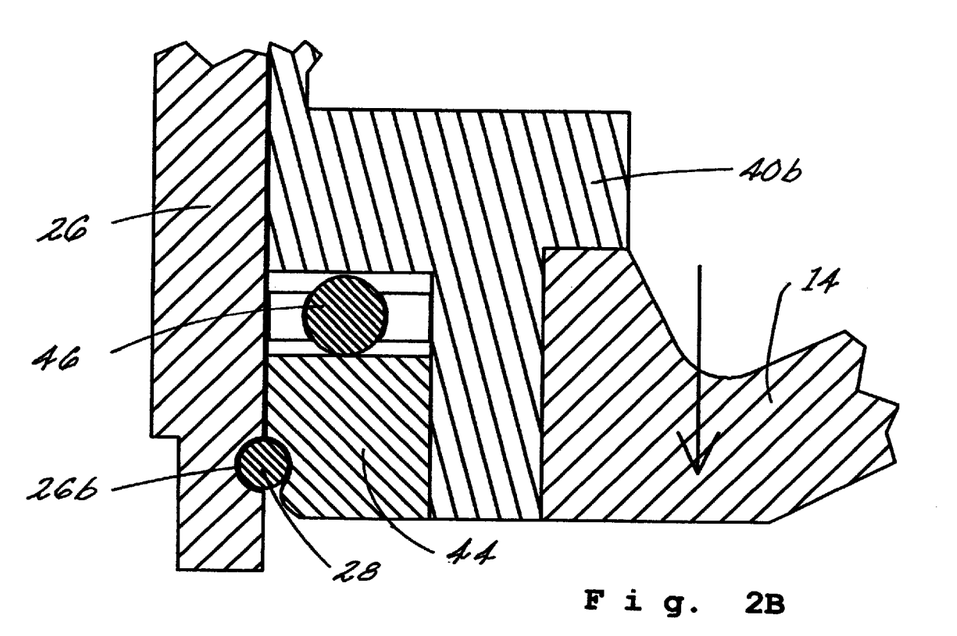
FIG. 2B is the sectional view of a further assembly stage wherein the locking ring is locked into place by relative axial movement between the support shaft and a press ring according to the invention.
Figure 5:
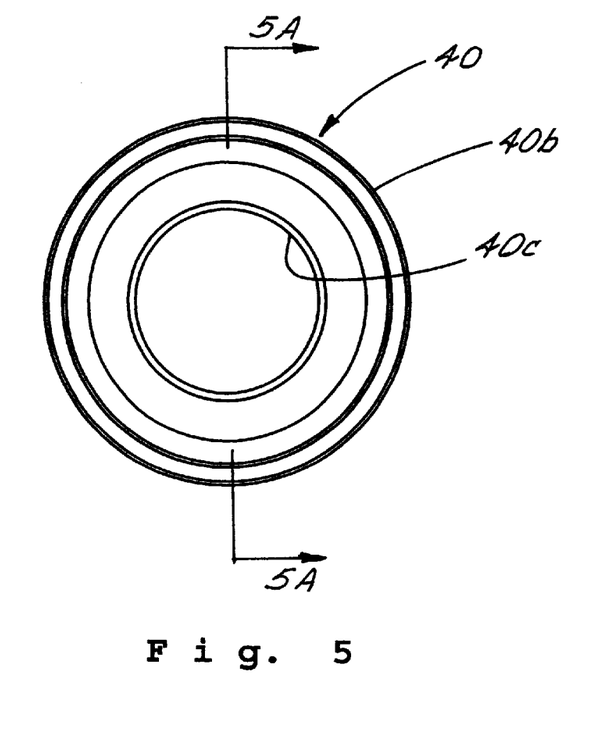
FIG. 5 is a rear elevation of a operator member for a keyless chuck according to the invention.
Figure 5A:
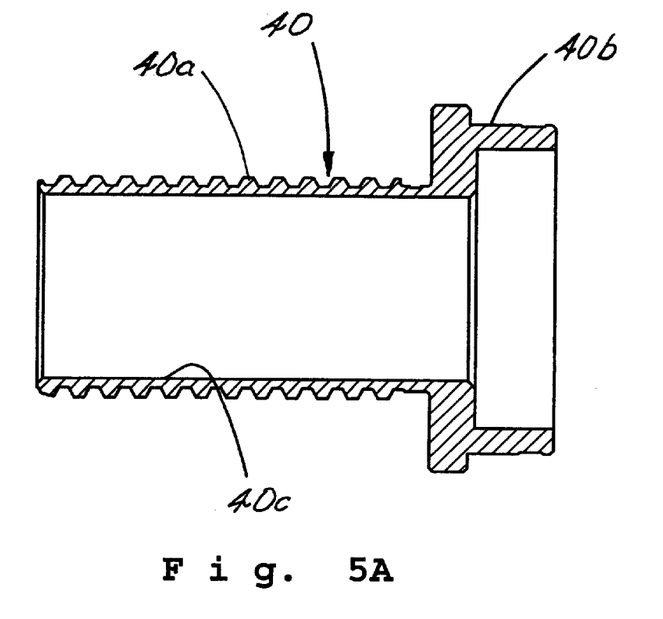
FIG. 5A is a sectional view taken along line 5A—5A of FIG. 5.

Traveler 32 is threadably carried on operator barrel 40a which has a hollow interior 40c (FIGS. 5, 5A). Support shaft 26 of support body 20 is rotatably fitted within hollow interior 40c of operator barrel 40a so that the operator barrel rotates about support shaft 26 in opening and closing of the chuck jaws 16. Shaft end 26b of support shaft 26 extends slightly through rear sleeve 14 so that shaft groove 26b can be fitted with a lock ring 28, as can best be seen in FIG. 2. Operator 40 is pressed within sleeve 14 to rotate with rear sleeve 14. Rear sleeve 14 is manually rotated to activate the chuck to open and close chuck jaws 16. When operator 40 rotates through rotation of the rear sleeve, traveler 32 moves up and down the threaded barrel 40a of operator 40. In this manner, chuck jaws 16 open and close, as will be described below in more detail. To complete the assembly, there is a press ring 44 which is located between the inside of operator base 40c and locking ring 28, and axially around support shaft 26. There is a ball bearing 46 captured between press ring 44 and the interior of operator base 40b. Finally, locking ring 28 is received in a generally circular groove formed by press ring groove 44a and support body shaft groove 26b formed in end 26a of support body shaft 26. Lock ring 28 is retained by a rounded lip 44b of press ring 44 in groves 44a and 26b (FIGS. 2A, 2B). Press ring 44 and locking ring 28 constitute a locking member for retaining the assembly together. A ball bearing 46 is disposed between press ring 44 and operator base 40b, the surfaces of which function as lower and upper bearing races, respectively. As jaw bites tighten about the work tool, a backward reaction force is produced which loads ball bearing 46. A wavy spring 50 is carried between a front edge 12a of front sleeve 12, and a rear edge 14a of rear sleeve 14 (FIG. 2). A sleeve gap 52 is defined between the front and rear edges 12a, 14a, of the front and rear sleeves 12, 14, and wavy spring 50 occupies the sleeve gap to take up the slack between the rear and front sleeves to provide a tight fit. To install lock ring 28 the rear sleeve moves toward the front sleeve to create a space that allows the lock ring to be inserted into place in groove 26b (FIG. 2A). Rear sleeve 26 may then be moved rearward whereby locking ring 28 snaps past lip 44b into groove 44a of press ring 44 (FIG. 2B). When assembled, press ring 44 and lock ring 28 are in a state of compression so that they cannot be unintentionally separated. After lock ring 28 is inserted into place, the wavy spring 50 biases the front and rear sleeves apart to maintain a tight assembly, yet allow relative movement between the front and rear sleeves as will be further explained herein.

In operation, when rear sleeve 14 is rotated axially around support body shaft 26 chuck jaws 16 open, and when rear sleeve 14 is rotated in the opposite direction, chuck jaws 16 close. In opening the jaws, rotation of rear sleeve 14 causes traveler 18 to thread down on operator member 40. This retracts the jaws. To close the jaws an opposite rotation causes traveler nut 18 to travel upwards causing the jaws to come together in a tool gripping position to grip a work tool, such as a drill bit or other tool, tightly and reliably in place.

As can best be seen in FIG. 2, a release space 60 is defined between traveler 32 in its upper most position when gripping a tool or bit, and the bottom of support body head 22. Less release torque is required because of the release space 60 between traveler 32 and support body head 22 than in the case of front sleeve actuated chucks. When rear sleeve 14 is rotated to release jaws 16, operator barrel 40a moves forward past traveler nut 32 and contacts the bottom of support body head 22 of support body 20. When barrel 40a hits the bottom of support head 22, a reaction force is produced in a reverse direction which causes traveler 32 to thread down which releases jaws 16. Release space 60 provides a space of relatively loose turning between operator 40 and traveler 32. Therefore, when one begins to loosen the chuck jaws, rotation of rear sleeve 14 is fairly easy. Traveler nut 32 stays in the same relative position as the operator 40 is turned by rear sleeve 14 so that the jaws are not loosened by this operation. However, as soon as the end of operator barrel 40*a* hits the underneath of support body head 22, traveler nut 32 starts traveling backwards so that the nut is loosened. As the traveler nut loosens, the jaws begin to open. Therefore, rear sleeve 14 is not tight as in the prior chucks when the loosening motion is started.

The advantages of the above chuck construction will become more apparent from the following discussion. First, it will be seen that the construction allows ball bearing 46 to be in the rear of the chuck, instead of the front, so that it is removed from the front working area of the chuck and the contamination caused by a working chuck. The bearing is back loaded by forces pushing back towards the rear of the chuck when the chuck jaws are tightened rather than by being loaded by forces in the area of the jaws pushing backwards when the chuck is tightened as in prior front sleeve actuated chucks. The interior chuck structure, particularly for the support body in the front sleeve, is simpler because there is no need to machine a front bearing support on the support body, as well as multiple bores with interruption spaces for each jaw bore in the support body. Locking ring 28, at the back, allows the chuck to easily be assembled and disassembled during manufacture without damaging any parts. Even the front and rear sleeves may be separated, while still pressed onto support body head 22 and operator 40, without damage for component replacement and repair. Chuck jaws 16 are non-threaded, there are no threads on any portion of the jaws as in the prior art chuck jaws so that jaws 16 may be hardened to a hardness of 58 Rockwell, for example, harder than most work tools, such as twist drills and the like. Non-threaded jaws 16 are driven by an increased jaw surface, as opposed to the limited area of threads as in the prior art, by the bearing surfaces of traveler nut 32 pushing against the increased shoulder areas of jaw and fittings 36. Because the jaws are non-threaded, one jaw fits all the passages bored into support body head 22, as opposed to the three different jaws required by the prior art using threaded jaws. Most important, the rotating operator 40 and non-rotating traveler 32 drive chuck jaws 16 to provide increased gripping torque at the jaw bites for a given input torque from rotation of rear sleeve 14. It has been found according to the invention that the chuck of the present invention produces 200 inch pounds of grip torque at the jaw bites for 100 inch pounds input by hand tightening of rear sleeve 14. Whereas prior art drill bits which are front sleeve actuated produce about 60 inch pounds of grip torque at the jaw bites for a 100 inch pounds input at the front sleeve. Thus, it can be seen that the chuck of the present invention grips a work tool with increased gripping torque. Because only a single uninterrupted jaw passage needs to be bored for each jaw, and the operator for the jaws is self-centering, the run out of the chuck is more true holding the work tool at a more true run out from the chuck as compared to the prior art chucks which use threaded jaws.

While a preferred embodiment of the invention has been described using specific terms, such description is for illustrative purposes only, and it is to be understood that changes and variations may be made without departing from the spirit or scope of the following claims.

What is claimed is:

1. A power tool chuck for gripping a work tool comprising:

a front sleeve and a rear sleeve having a chuck axis;

said front and rear sleeves being mounted for relative rotational movement;

a plurality of non-threaded chuck jaws for gripping the work tool;

a support body carried within the sleeve having a plurality of jaw bores for slidably receiving said chuck jaws;

said support body including a shaft having a remote end for mounting to a power tool drive member;

a reciprocating traveler carried in said sleeve;

an operator carried within said front and rear sleeves for reciprocating said traveler along said chuck axis;

said chuck jaws having nose ends with bites for gripping the work tool, and said chuck jaws having opposite remote ends carried by said traveler; and said operator being affixed with said rear sleeve for rotation so that rotation of said rear sleeve relative to said front sleeve in a first direction moves said traveler causing said nose ends of said chuck jaws to open, and rotation of said rear sleeve in a second direction moves said traveler causing said nose ends to grip said tool.

2. The device of claim 1 wherein said traveler includes internal traveler threads and said operator includes external operator threads which mate with said traveler threads for reciprocating said traveler.

3. The device of claim 1 wherein said traveler includes radial slots, and said remote jaw ends include end fittings which fit within said radial slots of said traveler so that said chuck jaws may be removably assembled with said traveler and disassembled for replacement and repair.

4. The device of claim 3 wherein jaw end fittings include narrow shanks which fit in said radial slots of said traveler.

5. The device of claim 4 including upper bearing surfaces formed on opposing sides of said radial slots on an upper side of said traveler; and said end fittings of said jaws include shoulders surrounding said narrow shank which bear against said upper bearing surfaces providing an increased area of force application from said traveler to said shoulder whereby an increased gripping torque is applied to said work tool at the jaw bites.

6. The device of claim 5 including lower bearing surfaces formed on opposing sides of said radial slots on a lower side of said traveler; and wherein said end fitting includes a widened flange carried by said narrow shaft against which said lower bearing surfaces bear when said chuck jaws are open.

7. The device of claim 5 including a bearing ledge formed adjacent closed ends of said radial slots for bearing against said shoulder of said jaw end fitting when said chuck jaws are closed.

8. The device of claim 1 wherein said operator includes an operator base press fitted with said rear sleeve, and said operator includes an operator barrel so that manual rotation of said rear sleeve causes said operator member to rotate whereby said traveler moves axially relative to said operator and said support body.

9. The device of claim 1 including a jaw release space defined between said support body and said operator; said operator having a jaw release position in which said operator moves axially relative to said support shaft into said release space beyond said traveler and engages said support body when said rear sleeve is rotated to open said chuck jaws so that a reaction force is created between said operator and support body engagement in said release position causing said traveler to move backwards to produce an initial release of said chuck jaws whereby further rotation of said rear sleeve causes said traveler to continue its backwards travel and open said chuck jaws more fully.

10. The device of claim 9 wherein operator includes a central operator barrel having external operator threads, said traveler includes internal traveler threads which mate with said operator threads on said operator barrel, and said operator barrel extends past said traveler threads to engage said support body in said jaw release position.

11. The device of claim 9 including a sleeve gap formed between said front and rear sleeves allowing relative axial movement between said front and rear sleeves, and including a biasing element disposed between said front and rear sleeves for biasing said sleeves apart.

12. The device of claim 11 wherein said biasing element includes an annular wavy spring carried between said front and rear sleeves.

13. The device of claim 11 wherein said sleeve gap decreases as said operator moves into said release space to engage said support body.

14. The device of claim 1 wherein said support body includes a support head affixed in said front sleeve and a support shaft extending from said support head and into said rear sleeve, said operator including a hollow operator barrel in which said support shaft is received so that said operator barrel rotates about said support shaft when said rear sleeve is rotated.

15. The device of claim 14 wherein said operator is fitted with said rear sleeve; and including a rear sleeve opening through which said a support shaft of said support body extends through said hollow operator barrel to provide a protruding shaft end, and a locking member engaging said protruding shaft end for locking said support shaft in place with respect to said rear sleeve.

16. The device of claim 15 wherein said shaft end includes a circumferential shaft groove, a press ring fitted around said shaft end having a complimentary circumferential groove, and said locking member including a locking ring received in said shaft and press ring grooves wherein said lock ring is loaded by rearward force as said rear sleeve is rotated and said chuck jaws are tightened about the work tool.

17. The device of claim 16 including a press ring groove lip allowing said locking ring to snap into said press ring groove to retain said locking ring therein.

18. The device of claim 16 including a ball bearing disposed between said press ring and said operator wherein surfaces of said press ring and operator provide lower and upper bearing races.

19. The device of claim 1 wherein said jaw bores formed in said support head have a bore axis with a prescribed inclination to said chuck axis; and wherein said traveler includes upper inclined bearing surfaces for engaging a first complimentary portion of said jaw end fitting for pushing said jaws through said inclined bores of said support body, and said upper bearing surfaces being inclined generally orthogonal to said bore axis for transferring and applying a full upward force from said operator to said jaws in the direction of said bore axis.

20. The device of claim 19 including lower inclined bearing surfaces formed on said traveler for bearing against a second complimentary portion of said remote jaw end when said traveler is moved to open said jaws; and said upper and lower inclined bearing surfaces being parallel to each other.

21. The device of claim 20 wherein said traveler includes slots; said remote jaw end fittings including narrow shanks which fit within said traveler slots; said upper bearing surfaces being formed on opposing sides of said slots on an upper side of said slots; and said lower bearing surfaces being formed on opposing sides of said slots on a lower side of said traveler.

22. The device of claim 21 wherein said first complimentary portion of said jaw ends includes an enlarged shoulder surrounding said narrow shank engaging said upper bearing surfaces; and said second complimentary portion includes an enlarged flange extending beyond said narrow shank engaging said lower bearing surfaces.

23. The device of claim 1 wherein said operator includes a central operator barrel extending along the chuck axis, external threads formed on said operator barrel, said operator barrel being fitted with said rear sleeve for rotation with said rear sleeve, and said traveler including a central threaded passage which is threaded on said threaded barrel of said operator so that said traveler reciprocates along said chuck axis without rotation in accordance with the rotation of said rear sleeve to push and pull said threaded jaws through said bores of said support body to close and open the jaw bites respectively.

24. A power tool chuck for a power tool having a plurality of chuck jaws which grip a work tool, said chuck comprising:
    a front sleeve and a rear sleeve having a central chuck axis wherein said front and rear sleeves are mounted to rotate relative to each other during opening and closing of the jaws;
    a plurality of non-threaded chuck jaws having nose ends with bites for gripping the work tool and remote ends;
    a unitary support body including a support head affixed in said front sleeve and a support shaft extending from said support head into said rear sleeve, said support head having a plurality of closed cylindrical bores receiving said chuck jaws, and said operator base and said rear sleeve are press fitted together so that manual rotation of said rear sleeve causes said operator barrel to rotate about said support shaft whereby said traveler reciprocates relative to said operator barrel and said support body, and said support shaft being adapted for a driving attachment to the power tool;
    a traveler carried within said rear sleeve for reciprocation along said chuck axis;
    said remote ends of said chuck jaws being carried by said traveler with said jaws being slidably carried and constrained in said support body;
    an operator for reciprocating said traveler along said chuck axis and
    said operator being rotated by rotation of said rear sleeve relative to said front sleeve.

25. The device of claim 24 wherein said traveler includes internal traveler threads and said operator includes external operator threads which mate with said traveler threads for reciprocating said traveler.

26. The device of claim 25 wherein said operator includes an operator base and a central operator barrel on which said operator threads are formed; and said operator base and said rear sleeve are press fitted together so that manual rotation of said rear sleeve causes said operator barrel to rotate about said support shaft whereby said traveler reciprocates relative to said operator barrel and said support body.

27. The device of claim 24 wherein said rear sleeve includes a rear opening through which said support shaft of said support body extends through said hollow operator barrel to form a protruding shaft end, a locking member engaging said protruding shaft end for locking said support shaft in place with respect to said rear sleeve, and a rear-loaded bearing surface disposed between said rear sleeve and said locking member which is loaded by a rearward reactive force exerted on said bearing surface during rotation of said rear sleeve to tighten said chuck jaws about the work tool.

28. The device of claim 26 including a jaw release space defined between said support body and said operator barrel; said operator having a jaw release position in which said operator barrel moves into said release space beyond said traveler and engages said support body when said rear sleeve is rotated to open said chuck jaws so that a reaction force is created between said operator and support body in said release position causing said traveler to move backwards to produce an initial release of said chuck jaws whereby further rotation of said rear sleeve causes said traveler to continue its backwards travel and open said chuck jaws more fully.

29. The device of claim 24 wherein said jaw bores formed in said support head have a bore axis with a prescribed inclination to said chuck axis; and wherein said traveler includes upper inclined bearing surfaces for engaging a first complimentary portion of said jaw end fitting for pushing said jaws through said inclined bores of said support body, and upper bearing surfaces being inclined generally orthogonal to said bore axis for transferring and applying a full upward force from said operator to said jaws in the direction of said bore axis.

30. The device of claim 29 including lower inclined bearing surfaces formed on said traveler for bearing against a second complimentary portion of said remote jaw end when said traveler is moved to open said jaws; and said upper and lower inclined bearing surfaces being parallel to each other.

31. A chuck for a power tool having a plurality of chuck jaws which grip a work tool in said chuck comprising:
a front sleeve and a rear sleeve having a central chuck axis;
a non-rotating traveler carried within said sleeve for reciprocation along said chuck axis;
a plurality of non-threaded chuck jaws having tool gripping ends and remote ends and said remote ends being carried by said traveler;
an operator operatively connected to said traveler for reciprocating said traveler so that said chuck jaws are caused to open and close as said operator is rotated in one direction and then another; and
said operator including an operator base fitted with said rear sleeve having a hollow interior; and said operator base including a rear sleeve opening through which a support shaft of said support body extends from said operator base to form a protruding shaft end, and a rear-loaded locking member engaging said protruding shaft end for locking said support shaft in place with respect to said rear sleeve, said locking member being loaded by a rearward reactive force produced by rotating said rear sleeve causing said jaws to grip the work tool.

32. The device of claim 31 wherein said operator and said rear sleeve are, press fitted together so that manual rotation of said rear sleeve causes said operator to rotate whereby said traveler moves axially relative to said operator and said support body.

33. The device of claim 31 including a sleeve gap formed between said front and rear sleeves allowing relative axial movement between said front and rear sleeves, and including a biasing element disposed between said front and rear sleeves for biasing said sleeves apart.

34. The device of claim 31 wherein said support body includes a support head affixed in said front sleeve and a support shaft extending from said support head and into said rear sleeve, and said operator includes a central operator barrel having a hollow interior in which said support shaft is received so that said operator barrel rotates about said support shaft.

35. The device of claim 34 wherein operator threads are formed on an exterior of said operator barrel, and said traveler includes internal threads which mate with said operator threads on said operator barrel to thread up and down in said operator barrel as said rear sleeve is rotated in opposing directions.

36. A chuck for a power tool having a plurality of chuck jaws of the type that open to receive a work tool and close to grip the work tool, wherein said chuck comprises:
a front sleeve;
a rear sleeve carried with said front sleeve for relative rotation;
a stand-alone, integral chuck jaw unit fitted within said front and rear sleeves in a removable manner; wherein said chuck jaw unit includes:
a plurality of chuck jaws having nose ends for gripping the work tool about a central chuck axis and remote jaw ends;
a support body having a support head fitted within said front sleeve with individual closed cylindrical jaw bores formed in said support head for receiving said chuck jaws;
said support body having a support shaft with a remote end extending through said rear sleeve for mounting to the power tool;
a traveler affixed to said remote ends of said chuck jaws; an operator rotatable received about said support shaft and, fixed for rotation with said rear sleeve;
said operator operatively associated with said traveler to cause said traveler to reciprocate along said chuck axis to open and close said chuck jaws;
whereby said stand-alone chuck jaw unit may be assembled with and disassembled from said front and rear sleeves for assembly and repairs as a stand-alone operating unit.

37. The device of claim 36 wherein said traveler includes internal traveler threads and said operator includes external operator threads in the form of a jack screw which mates with said traveler threads to reciprocate said traveler along said chuck axis.

38. The device of claim 36 including a bearing member fitted against said operator of said chuck unit and carried with said rear sleeve facilitating manual rotation of said rear sleeve and operator relative to said support shaft whereby said traveler reciprocates axially relative to said operator and said support shaft when said rear sleeve is rotated.

39. The device of claim 38 including a sleeve gap formed between said front and rear sleeves allowing relative axial movement between said front and rear sleeves, and including a biasing element disposed between said front and rear sleeves for biasing said sleeves apart.

40. The device of claim 39 including a jaw release space defined between said support body and said operator; said operator having a jaw release position in which said operator moves into said release space beyond said traveler and engages said support body when said rear sleeve is rotated to open said chuck jaws so that a reaction force is created between said operator and support body engagement in said release position causing said traveler to move backwards to produce an initial release of said chuck jaws whereby further rotation of said rear sleeve causes said traveler to continue its backwards travel and open said chuck jaws more fully.

41. The device of claim 36 wherein said operator includes a hollow operator barrel in which said support shaft is received so that said operator barrel rotates about said support shaft as said rear sleeve is rotated.

42. The device of claim 41 wherein said operator is fitted with said rear sleeve and including a locking member for locking said support shaft and said operator together with respect to said rear sleeve so that said front sleeve, integral chuck unit, and said front sleeve are assembled together.

43. The device of claim 42 wherein said support shaft includes a circumferential shaft groove, and said locking member including a press ring fitted around said shaft end having a complimentary circumferential groove, and locking ring received in said shaft and press ring grooves.

44. An integral stand-alone chuck jaw unit assembly for a power tool chuck, said power tool chuck being of the type which includes a front sleeve and a rear sleeve with a central chuck axis, and a plurality of chuck jaws extendable from the front sleeve of the type that open to receive a work tool and close to grip the work tool, wherein said stand-alone chuck unit assembly comprises:
- a plurality of chuck jaws having nose ends for gripping the work tool and remote ends remote from said nose ends;
- a support body including a support head having individual closed jaw bores slidably receiving and constraining said chuck jaws;
- said support head for being affixed in said front sleeve, and a support shaft extending from said support head for extending through said rear sleeve for mounting to the power tool;
- a reciprocating traveler to which said fitted ends of said chuck jaws are fitted;
- a central operator for being fitted in said rear sleeve, said central operator being operatively associated with said traveler to cause said relative axial movement between said traveler and said operator so that said chuck jaws are reciprocated in said support body between open and closed positions for receiving and gripping a work tool, respectively; and
- a removable locking member for locking said support shaft and central operator together so that said chuck jaws, said support body, said traveler, and said operator are assembled together as an integral stand-alone chuck unit whereby said chuck unit may be assembled and tested as a power tool chuck before assembled with said front and rear sleeves, and may be disassembled for repair.

45. The device of claim 44 wherein said operator includes a hollow operator barrel in which said support shaft is received so that said operator barrel rotates about said support shaft upon rotation of said rear sleeve in said chuck unit and said operator is allowed to move axially relative to said support shaft.

46. The device of claim 45 wherein operator threads are formed on an exterior of said operator barrel, and said traveler includes internal threads which mate with said operator threads on said operator barrel so that said travel reciprocates on said operator threads without rotation.

47. The device of claim 44 wherein said shaft end includes a circumferential shaft groove, and said locking member includes a press ring fitted around said shaft end having a complimentary circumferential groove, and a locking ring received in said shaft and press ring grooves.

48. The device of claim 47 including a rear-loaded bearing disposed between said press ring and said operator wherein surfaces of said press ring and operator provide lower and upper bearing surfaces whereby a rearward reactive force produced by tightening said chuck jaws about the work tool loads said bearing surfaces.

49. The device of claim 45 wherein said jaw bores formed in said support head have a bore axis with a prescribed inclination to said chuck axis; and wherein said traveler includes upper inclined bearing surfaces for engaging a first complimentary portion of said jaw end fitting for pushing said jaws through said inclined bores of said support body, and upper bearing surfaces being inclined generally orthogonal to said bore axis for transferring and applying a full upward force from said operator to said jaws in the direction of said bore axis; and lower inclined bearing surfaces formed on said traveler for bearing against a second complimentary portion of said remote jaw end when said traveler is moved to open said jaws; and said upper and lower inclined bearing surfaces being parallel to each other.

50. The device of claim 49 wherein said traveler includes slots; said remote jaw end fittings including narrow shanks which fit within said traveler slots; said upper bearing surfaces being formed on opposing sides of said slots on an upper side of said slots; and said lower bearing surfaces being formed on opposing sides of said slots on a lower side of said traveler; and said first complimentary portion of said jaw ends includes an enlarged shoulder surrounding said narrow shank engaging said bearing surfaces; and said second complimentary portion includes an enlarged flange extending beyond said narrow shank engaging said lower bearing surfaces.

51. A method for assembling and disassembling a chuck of a power tool which grips a work tool comprising:
- providing a front sleeve;
- providing a rear sleeve movable rotationally and axially relative to said front sleeve when assembled;
- providing a stand-alone, integral chuck jaw unit which includes a support body having a plurality of chuck jaws slidably carried within said support body, a traveler affixed to ends of said support jaws for moving said chuck jaws forward and backwards in said support body between closed and open positions, respectively, and an operator carried with said rear sleeve for reciprocating said traveler;
- pressing said support body in said front sleeve;
- pressing said operator in said rear sleeve and placing said operator around a circular shaft of the support body; and
- affixing a removable locking member around said circular shaft of said chuck jaw unit to retain said rear sleeve and complete the assembly which locking member can be removed for disassembling the chuck.

52. The method of claim 51 including providing an operator having external threads, and a traveler having a central passage with interior threads which threadably mate with said operator threads wherein the method comprises assembling said threaded traveler on the threads of said operator so that rotation of said rear sleeve and operator cause said traveler to reciprocate along said operator threads.

53. The method of claim 51 including assembling said chuck by inserting a support shaft of said support body in a hollow operator barrel of said operator in such a manner that an end of said support shaft protrudes through a rear opening of said rear sleeve; and
- affixing said removable locking member to said protruding end of said support shaft whereby said assembly is held together.

54. The method of claim 53 including installing a ball bearing around said support shaft, fitting a press ring around said support shaft adjacent said ball bearing, and affixing said lock ring between said press ring and support shaft to complete said assembly.

55. The method of claim 53 including inserting a biasing member between said front and rear sleeves; forcing rear sleeve toward front sleeve, and affixing said locking member to said protruding end of said support shaft.

56. The method of claim 55 including disassembling said chuck by forcing said rear sleeve toward front sleeve and against said biasing force, and disengaging said locking member from said protruding end of said support shaft.

* * * * *